United States Patent [19]

Nordquest

[11] Patent Number: 5,183,868
[45] Date of Patent: Feb. 2, 1993

[54] OLEFIN POLYMERIZATION OVER PI-OLEFIN COMPLEX OF CHROMIUM SUPPORTED ON ALUMINOPHOSPHATE

[75] Inventor: Kim W. Nordquest, Rocky Mount, N.C.

[73] Assignee: Phillips Petroleum Company, Bartlesville, Okla.

[21] Appl. No.: 556,631

[22] Filed: Jul. 23, 1990

[51] Int. Cl.$^5$ .......................... C08F 4/69; C08F 4/622
[52] U.S. Cl. .................................. 526/155; 526/134; 526/154; 526/160; 526/352; 502/102; 502/117; 502/118; 502/132; 502/152; 502/154
[58] Field of Search ............... 526/155, 160, 154, 134, 526/352; 502/102, 117, 118, 132, 152, 154, 155

[56] References Cited

U.S. PATENT DOCUMENTS 4,105,844  8/1978  McDaniel ........................... 526/106
4,424,139  1/1984  McDaniel et al. .................. 502/117

OTHER PUBLICATIONS

Chem. Ber. 105, 3346-3356 (1972) Muller Und. Mertschenk.

Primary Examiner—Fred Teskin
Attorney, Agent, or Firm—Laney, Dougherty, Hessin & Beavers

[57] ABSTRACT

Olefins are polymerized using, as a catalyst, a pi-olefin complex of a transition metal supported on aluminophosphate. The most effective complexes are cycloheptatrienyl-(1,3-cycloheptadiene)chromium(-1) compounds and alkyl-substituted derivatives thereof. A metal alkyl co-catalyst, such as triethylborane or triethylaluminum, can also be present. The catalyst is best suited for forming ethylene polymers and copolymers. Both the polymerization process using the described catalyst, and the catalyst system, per se, constitute different aspects of the invention.

13 Claims, No Drawings

ований ON PI-OLEFIN
OLEFIN POLYMERIZATION OVER PI-OLEFIN COMPLEX OF CHROMIUM SUPPORTED ON ALUMINOPHOSPHATE

FIELD OF THE INVENTION

This invention relates to a process for polymerizing olefins, and to a new pi-olefin transition metal catalyst system used in such polymerization. More particularly, a pi-olefin chromium(-1) complex on an aluminophosphate support is used as an olefin polymerization catalyst system.

BACKGROUND OF THE INVENTION

Brief Description Of The prior Art

In *Chem. Ber.* 105, 3346–3356 (1972) Müller and Mertschenk disclose a method of preparing a transition metal complex with a seven-member ring ligand. Transition metals which have been utilized with such seven-membered cyclic ligands have included vanadium, chromium, iron, cobalt and titanium. These complexes each contain pi-bonded seven-membered ring ligands. This prior art literature disclosure specifically teaches the preparation of cycloheptatrienyl-(1,3-cycloheptadiene) chromium(-1). It does not disclose utilization of this compound in any type of polymerization procedure, or suggest that it exhibits any catalytic activity.

The polymerization of olefins using a chromium-containing catalyst system has been known for many years. Generally, the most effective of such chromium catalyst systems have employed calcined chromium on a silica-containing base. In all of such systems, so far as they are known, the chromium metal has been present in the catalyst complex in a positive valence form, and, most frequently, in the hexavalent form when such catalysts have been used for olefin polymerization.

In U.S. Pat. No. 4,105,844, olefins are polymerized with a catalyst which is formed by mixing a supported chromium oxide composite with an adjuvant which is 1,3,5-cycloheptatriene or an alkyl substituted derivative thereof. A silicon-containing material, such as silica, silica-alumina and the like, is the suggested base or support for the chromium oxide portion of this catalyst system. The catalyst contains from about 0.5 to about 4.0 weight percent of chromium, calculated as chromium oxide, based on the weight of the total support plus chromium oxide. The adjuvant can be added to the reactor as a separate stream in any solvent which is inert in the process. The adjuvant can also be used to pretreat the catalyst prior to charging it to the reactor.

The process described in U.S. Pat. No. 4,105,844 is directed to the production of normally solid ethylene homopolymers or ethylene copolymers, using the supported chromium complex and the adjuvant for the catalyst. The polymers are made by contact with the catalyst and adjuvant in either a particle-form process or in a solution-form process using the appropriate polymerization conditions. Such conditions are described in U.S. Pat. No. 3,939,137 for solution-form polymerization, and in U.S. Pat. No. 3,950,316 for particle-form polymerization.

U.S. Pat. No. 4,424,139 discloses methods for producing phosphate-containing chromium catalyst systems for olefin polymerization, and particularly phosphate-containing pibonded chromium catalyst systems for olefin polymerization. The particular chromium material here used is chromocene, in which the chromium is divalent. The divalent cation is coordinated by two relatively negatively charged cyclopentadienyl ligands. Among other supports indicated to be suitable for the chromium compound is aluminum phosphate. In one of the support structures, the aluminum and phosphorus components are selected so as to give an atom ratio of phosphorus to aluminum within the range of 0.2:1 to 1:1, preferably 0.6:1 to 0.9:1.

In the activation of the catalyst, temperatures in the broad range of from about 150° C. to 1,000° C. can be used with the time required for catalyst activation being from 1 minute to about 24 hours.

SUMMARY OF THE INVENTION

In accordance with the present invention, a novel catalyst for the polymerization of olefins is disclosed and is an organometallic pi-olefin complex of negative valence chromium, and more specifically, is cycloheptatrienyl-(1,3-cycloheptadiene) chromium(-1) and alkyl derivatives thereof. The compound can be represented by the structural formula set forth on page 3349 of *Chem. Ber.* 105, 3346–3356 (1972), Müller and Merschenk.

The chromium complex is preferably supported on an aluminophosphate support. Although the pi-olefin chromium(-1) complex is a known compound, its use as a supported catalyst is not believed to have previously been proposed. The polymerization of olefin and comonomers of olefin, including specifically ethylene and olefinic comonomers of ethylene containing from 3 to 8 carbon atoms, is carried out over this catalyst at from atmospheric pressure up to about 600 psi and from ambient temperature up to about 100° C.

A cocatalyst which is a trihydrocarbyl metal compound can be utilized, and can be combined with the catalyst at the outset, or added to the reaction zone concurrently with, but separate from the catalyst.

An object of the present invention is to produce a solid polyethylene resin containing few butyl branches and few ethyl branches.

DETAILED DESCRIPTION OF A PREFERRED EMBODIMENT OF THE INVENTION

The pi-olefin chromium(-1) complex which is supported on a suitable activated support to form the catalyst of the invention is a negative valence chromium complex of pibonded seven-membered cyclic ligands. It has the formula $CrC_{14}H_{17}$. Similar complexes having the rings substituted with alkyl groups containing from one to six carbon atoms can also be employed. The pi-olefin in these complexes can be selected from the group consisting of the (1,3,5-cycloheptatrienyl)-(1,3-cycloheptadiene), 1-methyl-(1,3,5-cycloheptatrienyl)-(1,3-cycloheptadiene), 2-ethyl-(1,3,5-cycloheptatrienyl)-(1,3-cycloheptadiene), 7-butyl-(1,3,5-cycloheptatrienyl)-(1,3-cycloheptadiene), 7-n-hexyl-(1,3,5-cycloheptatrienyl)-(1,3-cycloheptadiene), 7-diethyl-(1,3,5-cycloheptatrienyl)-(1,3-cycloheptadiene), 5,7,7-trimethyl-(1,3,5cycloheptatrienyl)-(1,3-cycloheptadiene), 2,3,7,7-tetramethyl-(1,3,5-cycloheptatrienyl)-(1,3-cycloheptadiene), and mixtures thereof. These complexes, ready for placement on the support material after dissolution in a suitable solvent, can be made using a 1,3-cycloheptadiene/isopropyl/Grignard reagent/ether system as described in *Chem. Ber.* 105, 3346–3356 (1972).

The base or support for the pi-olefin complex of a transition metal is preferably an activated metal phosphate-containing support. The activated metal phosphate-containing support, which is preferably an aluminophosphate in solid particulate form, can be prepared in several different ways, such as those which are described in U.S. Pat. No 4,424,139 which is incorporated herein by reference. Thus, for example, an aluminum salt can be combined with the source of phosphate ions in an aqueous medium, and neutralized with a base to give a hydrogel. Alternatively, a polar organic solvent can be used. In yet another method, a hydrolyzable organoaluminum compound such as aluminum alkoxide can be combined with orthophosphoric acid to give a xerogel directly.

The aluminum and phosphorus components of the support are selected so as to give a mole ratio of phosphorus to aluminum within the range of about 0.2:1 to about 1:1, and preferably, from about 0.6:1 to about 0.9:1. The most preferred mole ratio of phosphorus to aluminum is about 0.6:1.

Other techniques for forming this solid support are well understood in the art.

In addition, silicate-type support material used in other chromium-type catalysts as the support can also be used.

Suitable solvents for the pi-olefin chromium(-1) complex for purposes of placing it on the preferred aluminophosphate base include alkanes, cycloalkanes, alkenes and aromatic hydrocarbons. Exemplary solvents include n-pentane, n-hexane, decane, cyclohexane, methylcyclohexane, 1-butene, benzene, xylenes and mixtures of these compounds. The most preferred solvent is n-pentane. Generally, the solution used will contain from about 0.002 to about 25 weight percent of the pi-olefin chromium(-1) complex, whether it is used to impregnate the support, or whether it is added separately.

Preferably, a sufficient quantity of a solution of the negative valence chromium complex is used to completely wet the aluminophosphate support material and fill the porous structure so as to insure even distribution of the complex on the support.

Further, a sufficient volume of the solution of the organochromium complex is used so as to provide from about 0.01 to 10, and preferably 0.1 to 5, and most preferably from about 0.2 to about 2.0 weight percent chromium, based on the weight of the total catalyst system (complex and support). Contact between the support and the organochromium solution is effected in a conventional way, such as by slurrying, and at any conventional temperature. Generally, ambient temperature is used, although temperatures ranging from about the freezing point of the solvent, to as high as about 300° F. can be employed during the contacting period. Contact times from a few seconds to several hours are adequate. The incorporation of the chromium compound onto the activated aluminophosphate base is preferably carried out in an inert atmosphere, such as nitrogen, or under a vacuum, and the resulting support catalyst is maintained in an inert atmosphere or under vacuum until it is used. The support and the chromium complex can, alternatively, be added to the polymerization reactor as separate streams. The same amounts are used when the organochromium complex is added to the reactor as a separate stream.

The cocatalyst which can optionally be used with the pi-olefin chromium complex/aluminophosphate catalyst in the polymerization process of the invention is an organometal compound. The use of such cocatalyst appears to improve the yield of polymer. Preferably, the cocatalyst is a trihydrocarbylborane; more preferably, a trialkylborane in which the alkyl groups preferably contain from one to eight carbon atoms. The most preferred trialkylborane compounds are those in which the alkyl groups contain from about 2 to 5 carbon atoms per group. Less preferred than these borane compounds, but also suitable, are aluminum compounds of the formula $AlR'_nX_{3-n}$ where "X" is a hydride or a halide, R' is a 1 to 12 carbon atom hydrocarbyl radical, and "n" is an integer of 1 to 3.

The cocatalyst, when it is used, is utilized in an amount so as to give an atom ratio of metal in the cocatalyst to chromium in the principal catalyst in the range from about 0.5:1 to about 10:1, and preferably of from 2:1 to about 5:1. The cocatalyst can either be premixed with the catalyst, or added as a separate stream to the polymerization zone. The latter procedure is preferred.

Contacting of the monomer(s) with the catalyst of this invention can be effected in any manner utilized in the art of solid catalyst polymerization of olefins. One convenient method is to suspend the catalyst in an organic medium, and to agitate the mixture to maintain the catalyst in suspension throughout the polymerization process. Solution polymerization can also be used.

With slurry polymerization of ethylene and copolymer systems which include predominantly ethylene, the temperature range during polymerization is broadly from about 20° C. to about 110° C., and is preferably from about 80° C. to about 100° C. The pressure used is from about 100 psi to about 600 psi, with the preferred pressure being from about 300 psi to about 500 psi. Commercial systems are generally run as close to the maximum temperature as possible, i.e., 110° C.±5° C., in order to get the highest possible melt index.

If the object is to produce a copolymer, 0.5 to 20 mole percent comonomer or more can be used, although enough to give 0.2 to 3 mole percent incorporation is preferred. As used herein, the term "at least predominantly ethylene" means an essentially pure ethylene monomer feed, or a feed containing ethylene as the principal monomer, with from about 0.5 to about 20 mole percent comonomer. The comonomer used is preferably a 1-olefin compound containing from 3 to 8 carbon atoms.

In this regard, it must be kept in mind that HLMI/MI ratios (shear response) are meaningul only if compared on a comparable melt index basis. The references herein to "Melt Index" (MI) refers to ASTM D 1238-65T, Condition E, and "High Load Melt Index" (HLMI) refers to ASTM D 1238-65T, Condition F, the difference being 21,600 grams weight in the high load test and 2,160 grams weight in the regular melt index test, the temperature being 190° C. in each instance when the tests are utilized for predominantly ethylene polymers and copolymers.

EXAMPLE I

The cycloheptatrienyl-(1,3-cycloheptadiene)chromium(-1) portion of the catalyst (that portion which is supported on the aluminophosphate support) is a known compound and its preparation by Grignard reagent chemistry is described in *Chem. Ber.* 105, 3346–56 (1972).

The organochromium complex was prepared in accordance with the method disclosed in the cited literature reference as follows:

To a three neck flask under argon were added a magnetic stirring bar, 9.03 g of magnesium turnings (0.372 mol), 100 ml of dry, oxygen-free diethyl ether and 5 ml of dry isopropylbromide. This amount was a first part of a total quantity (46.3 g) of isopropylbromide to be added to the flask.

The mixture was stirred in a water bath at 17° C. The mixture became cloudy within a minute after stirring was commenced, and then darkened. The addition of the remainder of the isopropylbromide, contained in 35 ml of diethyl ether, via a dropping funnel was then continued. The addition of the isopropylbromide in a total amount of 46.3 g. (0.376 mol) was completed about an hour after commencing the dropping funnel addition. The mixture was then stirred slowly for about two hours, followed by transfer under argon through a transfer tube containing glass wool to remove unreacted magnesium metal. The mixture, following removal of the magnesium, was placed in a 250 ml dropping funnel.

To a one liter, three neck flask under argon was added 8.9 g of $CrCl_3$ (0.56 mol), 10.8 ml cycloheptatriene filtered through $Al_2O_3$ to remove stabilizer, 9.05 g of 1,3-cycloheptadiene filtered through A1203 to remove stabilizer and 120 ml diethyl ether. The flask was next fitted with a mechanical stirrer, an argon inlet tube, and the dropping funnel containing the Grignard reagent prepared as described above.

After cooling the flask in a $-52°$ C. isopropanol bath, the isopropylmagnesiumbromide solution (Grignard reagent) was slowly added to the three neck flask from the dropping funnel over a period of about 17–20 minutes. By completion of the addition of Grignard reagent, the temperature of the flask had increased to $-40°$ C.

Upon addition of the Grignard reagent, the mixture became dark purple. The cold bath was removed from around the three neck flask, and the slurry was allowed to slowly warm to room temperature. Ultraviolet radiation was then commenced after the flask and ultraviolet lamp were enclosed in an aluminum foil shield. After $7\frac{1}{4}$ hours of irradiation of the contents of the flask with concurrent stirring, the ultraviolet source lamp was turned off. At that time, virtually all of the ether which had been used in preparing the Grignard reagent had evaporated due to the heat, and an additional 150 ml of dry, oxygen-free ether was added to the flask, and the reaction mixture was allowed to stand overnight.

Methanolysis was begun by cooling the flask to a temperature of about $-50°$ C., and adding to the flask, a solution of 135 ml anhydrous methanol in 100 ml ether over a period of 30 minutes. An additional 250 ml of ether was added in order to make the slurry thin enough to pour. After warming the slurry to room temperature, it was filtered, and the residue was then washed with three washes of 50 ml of ether. The residue was discarded and the filtrate was evaporated to a blackish, gummy solid. This solid was extracted with pentane, and the combined pentane fractions were filtered. The combined filtrate from the pentane washings and filtration was evaporated to about 30 ml, and a brown-red solid formed at that point. The filtrate (mother liquid) containing the brown solid was allowed to stand over night.

A sample of about 0.4 ml of this mother liquid containing the chromium complex was taken and was added, after solution in seven ml pentane, to an aluminophosphate support material (0.6 P/Al). The reddish solution of the organochromium complex deposited as a bluish color on the aluminophosphate support. The supported chromium catalyst was then dryed under a flow of nitrogen to a dark blue-gray color. After it was dry, it started to turn a yellow-green. The nitrogen blanket was then replaced by ethylene and the flask was attached to a vacuum rack in order to maintain the level of ethylene pressure in the flask at close to one atmosphere. Within five minutes, additional ethylene was required to return the pressure to one atmosphere. The contents of the flask continued to take ethylene for two days.

The main body of the chromium complex-in-pentane solution was cooled at 78° C., and then filtered. The residue on the filter frit was dried to give 0.46 g of a greenish solid. The 0.46 g sample removed on the filter frit was treated with five ml of isopentane to try to dissolve it. It was partially soluble and produced a brown solution. Next, 5 ml of benzene was added to the undissolved residue and the isopentane solution, but this still did not dissolve all of the solid. Finally, forty-five ml of toluene was added, and an additional amount, but not all, of the solid dissolved.

A 5 ml sample of the composite from the three solutions, isopentane, hexane and toluene, was added to 2.2 g of an aluminophosphate support material in which the weight ratio of phosphorus to aluminum was 0.6:1. In this instance, support material had been prepared by calcining the aluminophosphate at 600° C. over a two hour period of time. The solvent remaining after deposit of the sample on the solid aluminophosphate support was decanted off to leave a greenish solid with a slight blue cast. Several isopentane washes were then used to remove the toluene from the supported catalyst. The aluminophosphate-supported catalyst system was then dried under flowing nitrogen.

A sample of about 0.112 g of the supported catalyst system was then charged to a 2 liter reactor, along with 50 ml of isobutane and ethylene. The polymerization was run at 90° C. After about five minutes no ethylene uptake was evident, and one ml (0.5 weight percent) of a triethylborane was added as a cocatalyst. The reactor was shut down after 31 minutes.

About 8 g of white polymer was yielded from the reaction, and an olefin odor was present in the reactor on completion of the polymerization. The productivity of the polymerization was thus about 8/.11 which was equivalent to about 73 g of polyethylene/g cat./.5 hr. This polymer was then analyzed for molecular weight, using and subjected to an NMR structural analysis.

The NMR analysis showed that the polymer was an ethylene homopolymer. Long chain branches were present to the extent of 0.037 mol percent or about 1.9 butyl (or higher) branches per backbone carbon atoms in the chain, and about 0.075 mol percent or about 3.7 ethyl branches per 10,000 backbone carbon atoms. No other branches were detected. Analysis showed both saturated and vinyl terminal groups were present in almost equal proportions in the polymer. The molecular weight (number average) by NMR was $6.05 \times 10^3$.

The remaining portion of this supported catalyst (made by placing 5 ml of the chromium complex solution on 2.2 g of aluminophosphate) was placed in a one hundred twenty-five ml catalyst flask, and the flask and its contents at this time weighed 115.31 g. The flask was then briefly flushed with ethylene and then attached to an ethylene line for continuously supplying ethylene to the flask under controlled conditions, so that the pressure in the flask could be maintained at 1.0 atmosphere. Ethylene uptake by the contents of the flask was observed immediately as evidenced by a slight warming of the wall of the flask opposite the reaction mixture therein, and a slight pressure drop. The weight of the flask was monitored periodically, and the results are set forth in Table I.

TABLE I

| Time | Flask Weight |
|---|---|
| 3:21 p.m. | 115.31 g |
| 3:32 p.m. | 115.26 g |
| 4:08 p.m. | 115.39 g |
| 4:58 p.m. | 115.56 g |
| The following day: | |
| 8:08 a.m. | 116.06 g |
| 9:55 a.m. | 116.06 g |
| 11:20 a.m. | 116.06 g. |

From the results reported in Table I, it will be perceived that the catalyst employed effectively polymerized ethylene.

Analyses determined that the amount of the organochromium complex (which had not been dissolved) in preparing the solution used to make the first supported catalyst showed that the amount of the chromium complex which had been deposited on the aluminophosphate at that time was about 0.5 weight percent of the total weight of the catalyst.

What is claimed is:

1. A polymerization process which comprises contacting at least one mono-1-olefin having 2 to 8 carbon atoms per molecule with a catalyst system comprising a pi-olefin complex of chromium (-1) supported on an activated aluminophosphate support wherein said pi-olefin is cycloheptatrienyl-(1,3-cycloheptadiene), or an alkyl substituted derivative thereof.

2. A polymerization process as defined in claim 1 wherein the mole ratio of phosphorus to aluminum in said activated aluminophosphate is from about 0.6:1 to 0.9:1.

3. A polymerization process as defined in claim 2 wherein the mole ratio of phosphorus to aluminum in said activated aluminophosphate is about 0.6:1.

4. A polymerization process as defined in claim 2 wherein said aluminophosphate support is prepared by activating the aluminophosphate at 600° F.

5. A polymerization process as defined in claim 1 wherein the polymerization of olefin is conducted at a temperature of from about 20° C. to about 110° C., and a pressure of from about 100 psi to about 600 psi.

6. A polymerization process as defined in claim 1 wherein the olefin polymerized comprises ethylene.

7. A polymerization process which comprises contacting at least one mon-1-olefin having 2 to 8 carbon atoms per molecule with a catalyst system comprising a pi-olefin complex chromium (-1) supported on an activated aluminophosphate support wherein said pi-olefin in said complex is selected from the group consisting of 1,3,5-cycloheptatrienyl)-(1,3-cycloheptadiene), 1-methyl-(1,3,5-cycloheptatrienyl)-(1,3-cycloheptadiene), 2-ethyl-(1,3,5-cycloheptatrienyl)-(1,3-cycloheptadiene), 7-butyl-(1,3,5-cycloheptatrienyl)-(1,3-cycloheptadiene), 7-n-hexyl-(1,3,5-cycloheptatrienyl)-(1,3-cycloheptadiene), 7-diethyl-(1,3,5-cycloheptatrienyl)-(1,3-cycloheptadiene), 5,7,7-trimethyl-(1,3,5-cycloheptatrienyl)-(1,3cycloheptadiene), 2,3,7,7-tetramethyl-(1,3,5-cycloheptatrienyl)-(1,3-cycloheptadiene), and mixtures thereof.

8. The process according to claim 7 wherein said compound is (1,3,5-cyloheptatrienyl)-(1,3-cycloheptadiene)-chromium (-1).

9. The process according to claim 8 wherein the polymerization is carried out at a temperature of from about 80° C. to about 100° C., and at a pressure of from about 300 psi to about 500 psi.

10. The process according to claim 9 wherein the mole ratio of phosphorus to aluminum in said aluminophosphate is from about 0.6:1 to about 0.9:1.

11. A polymerization process ad defined in claim 1 wherein said polymerization is carried out in the presence of a cocatalyst which is a trihydrocarbylborane compound.

12. A catalyst system comprising:
an aluminophosphate solid support; and
carried on said support, a pi-olefin negative valence chromium complex in which the pi-olefin in said complex is selected from the group consisting of (1,3,5-cycloheptatrienyl)-(1,3-cycloheptadiene), 1-methyl-(1,3,5-cycloheptatrienyl)-(1,3-cycloheptadiene), 2-ethyl-(1,3,5-cycloheptatrienyl)-(1,3-cycloheptadiene), 7-butyl-(1,3,5-cycloheptatrienyl)-(1,3-cycloheptadiene), 7-n-hexyl-(1,3,5-cycloheptatrienyl)-(1,3-cycloheptadiene), 7-diethyl-(1,3,5-cycloheptatrienyl)-(1,3-cycloheptadiene), 5,7,7-trimethyl-(1,3,5-cycloheptatrienyl)-(1,3-cycloheptadiene), 2,3,7,7-tetramethyl-(1,3,5-cycloheptatrienyl)-(1,3-cycloheptadiene), and mixtures thereof.

13. A catalyst system as defined in claim 12 wherein said pi-olefin negative valence chromium complex is cycloheptatrienyl-(1,3-cycloheptadiene)chromium (-1).

* * * * *

UNITED STATES PATENT AND TRADEMARK OFFICE
CERTIFICATE OF CORRECTION

PATENT NO.   : 5,183,868
DATED        : February 2, 1993
INVENTOR(S)  : Kim W. Nordquest It is certified that error appears in the above-indentified patent and that said Letters Patent is hereby corrected as shown below:

Column 2, line 59, after "5" and before "cycloheptatrienyl" insert a dash.

Column 5, line 24, delete "Al203" and insert --$Al_2O_3$-- therefor.

Column 8, line 4, delete "mon-1-olefin" and insert --mono-1-olefin-- therefor.

Column 8, line 16, after "3" and before "cycloheptadiene", insert a dash.

Column 8, line 29, delete "ad" and insert --as-- therefor.

Signed and Sealed this

Twenty-sixth Day of October, 1993

Attest:

BRUCE LEHMAN

*Attesting Officer*  *Commissioner of Patents and Trademarks*